US008041726B2

United States Patent
Chen et al.

(10) Patent No.: US 8,041,726 B2
(45) Date of Patent: *Oct. 18, 2011

(54) SYSTEM FOR EXECUTING A QUERY HAVING MULTIPLE DISTINCT KEY COLUMNS

(75) Inventors: Yao-Ching Chen, Saratoga, CA (US);
You-Chin Fuh, San Jose, CA (US);
Allan B. Lebovitz, San Jose, CA (US);
Li-Mey Lee, Cupertino, CA (US);
Fen-Ling Lin, San Jose, CA (US);
Lee-Chin Hsu Liu, San Jose, CA (US);
Yun Wang, Saratoga, CA (US);
Binghua Zhen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 605 days.

This patent is subject to a terminal disclaimer.

(21) Appl. No.: 12/212,431

(22) Filed: Sep. 17, 2008

(65) Prior Publication Data

US 2009/0012945 A1    Jan. 8, 2009

Related U.S. Application Data

(63) Continuation of application No. 10/320,909, filed on Dec. 17, 2002, now Pat. No. 7,487,140.

(51) Int. Cl.
*G06F 17/30* (2006.01)
*G06F 7/00* (2006.01)
(52) U.S. Cl. ........................................ 707/758
(58) Field of Classification Search .................. None
See application file for complete search history.

(56) References Cited

U.S. PATENT DOCUMENTS

| 4,595,995 A | 6/1986 | Alles |
| 5,027,388 A | 6/1991 | Bradshaw et al. |
| 5,519,860 A * | 5/1996 | Liu et al. ................ 707/999.007 |

(Continued)

FOREIGN PATENT DOCUMENTS

JP    2000172714 A    1/1998

OTHER PUBLICATIONS

A Framework for global optimization of aggregate queries. Chengwen Liu; Ursu A Proceedings of the Sixth International Conference on Information and Knowledge Management. CIKM'97, pp. 262-269, Published: New York, NY, USA, 1997, ix+378 pp.

(Continued)

*Primary Examiner* — Sathyanarayan Pannala
(74) *Attorney, Agent, or Firm* — Sawyer Law Group, P.C.

(57) ABSTRACT

A system and computer readable medium for executing a query to access data stored in a database, wherein the query includes a plurality of DISTINCT keys, is disclosed. The system and computer readable medium includes a capture module for identifying each of the plurality of DISTINCT keys in the query and a sort module coupled to the capture module for determining if more than one sort is needed to execute the query, performing a first DISTINCT operation on a first DISTINCT key of the plurality of DISTINCT keys, storing data fetched from the first DISTINCT operation in a master workfile only if more than one sort process is needed to execute the query, and utilizing the master workfile to perform subsequent DISTINCT operations on the other of the plurality of DISTINCT keys.

17 Claims, 3 Drawing Sheets

U.S. PATENT DOCUMENTS

| | | |
|---|---|---|
| 5,548,758 A | 8/1996 | Pirahesh et al. |
| 5,615,361 A | 3/1997 | Leung et al. |
| 5,706,495 A | 1/1998 | Chadha et al. |
| 5,713,015 A | 1/1998 | Goel et al. |
| 5,806,074 A | 9/1998 | Souder et al. |
| 5,822,748 A | 10/1998 | Cohen et al. |
| 5,857,180 A | 1/1999 | Hallmark |
| 5,864,842 A | 1/1999 | Pederson et al. |
| 6,009,265 A | 12/1999 | Huang et al. |
| 6,112,198 A | 8/2000 | Lohman et al. |
| 6,289,334 B1 | 9/2001 | Reiner et al. |
| 6,341,277 B1 | 1/2002 | Coden et al. |
| 6,356,888 B1 | 3/2002 | Egan et al. |
| 6,430,550 B1 * | 8/2002 | Leo et al. ............ 707/623 |
| 6,438,538 B1 | 8/2002 | Goldring |
| 6,449,605 B1 * | 9/2002 | Witkowski ............ 707/999.003 |
| 6,529,917 B1 | 3/2003 | Zoltan |
| 6,668,260 B2 | 12/2003 | Zoltan |
| 2002/0133507 A1 | 9/2002 | Holenstein et al. |
| 2002/0152422 A1 | 10/2002 | Sharma et al. |
| 2002/0188624 A1 | 12/2002 | Landin |
| 2003/0037029 A1 | 2/2003 | Holenstein et al. |
| 2003/0131027 A1 | 7/2003 | Holenstein et al. |
| 2003/0158852 A1 | 8/2003 | Zoltan |

OTHER PUBLICATIONS

Deciding distinctness of query results by discovered constraints. Bell S. Pact 96. Proceedings of the Second International Conference on the Practical Application of Constraint Technology, pp. 399-416, Published: Blackpool, UK, 1996, 464 pp.

Optimization of sequences of relational queries in decision-support environments. Badia A; Niehues M. Data Warehousing and Knowledge Discovery. First International Conference, DawaK '99. Proceedings (Lecture Notes in Computer Science vol. 1676), pp. 126-131, Published Berlin Germany, 1999, xii+400 pp.

* cited by examiner

SYSTEM FOR EXECUTING A QUERY HAVING MULTIPLE DISTINCT KEY COLUMNS

CROSS-REFERENCE TO RELATED APPLICATIONS

Under 35 USC §120, this application is a continuation application and claims the benefit of priority to U.S. patent application Ser. No. 10/320,909, filed Dec. 17, 2002, entitled "Method and System for Executing a Query Having Multiple Distinct Key Columns", all of which is incorporated herein by reference.

FIELD OF THE INVENTION

The present invention relates to database management systems, and in particular, to a system for executing a query having multiple DISTINCT key columns.

BACKGROUND OF THE INVENTION

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

The Structured Query Language (SQL) interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

One such operation is known as a DISTINCT operation, which causes the elimination of duplicate values in specified sets of data. In the SQL query
  SELECT (DISTINCT DEPT)
  FROM DATA_TABLE
DEPT is a key, which designates the column upon which the DISTINCT operation will be applied. Execution of the above query returns the set of unique departments from the table DATA_TABLE. Even if a particular department number appears in fifty rows of the table, it will only appear once in the result set of the query.

DISTINCT operations are frequently associated with aggregatation operations, such as AVG, COUNT, and SUM. Oftentimes, it is desirable to perform multiple DISTINCT operations for multiple columns in a table. Unfortunately, most current DBMSs restrict a user to only one DISTINCT key in the SELECT clause in any given query. In order to perform multiple DISTINCT operations, a single query is not allowed. Rather, the user must compose and submit separate queries to the DBMS for each one of the multiple DISTINCT keys. This leads to inefficiencies for the user, who is required to write multiple queries, and for the DBMS because multiple queries must be executed. Each query is associated with a cost of going to the DASD and retrieving the requested information. This cost is measured in computing resources and time expended.

One approach to resolving this problem has been implemented in DB2 UNO®, developed by International Business Machines of Armonk, N.Y. Here, the user is allowed to specify multiple DISTINCT keys in a query, such as:
  SELECT COUNT(DISTINCT EMPLOYEE), COUNT (DISTINCT DEPT)
  FROM DATA_TABLE
  GROUP BY (LAB_LOC)
This query is broken down and rewritten into two table expressions:
  SELECT COUNT(DISTINCT EMPLOYEE)
  FROM DATA_TABLE
  GROUP BY (LAB_LOC);
  SELECT COUNT(DISTINCT DEPT)
  FROM DATA_TABLE
  GROUP BY (LAB_LOC)
Each table expression is then executed in the same manner as would two separate queries. The result sets are then merged and returned to the user.

While the above described system allows the user to submit a query with multiple DISTINCT keys, it is still highly inefficient because it requires the system to execute multiple queries. As stated above, this burdens the system and increases the response time. Moreover, the query submitted by the user is broken down and rewritten during a pre-execution period known to those skilled in the art as a bind time. During bind time, execution parameters are determined and bound, i.e., saved, for use later during execution or runtime.

Thus, there exists a need for a method and system that allows for executing a query having multiple DISTINCT key columns. The method and system should be efficient and cost effective. The present invention addresses these needs.

SUMMARY OF THE INVENTION

The present invention discloses a system and computer readable medium for executing a query to access data stored in a database, wherein the query includes multiple DISTINCT key columns. The method and system of the present invention includes providing a first DISTINCT operation on a first DISTINCT key, storing data fetched from the first DISTINCT operation in a master workfile if more than one sort process is needed to execute the query, and utilizing the master workfile to perform subsequent DISTINCT operations for the other DISTINCT keys.

Through aspects of the system and computer readable medium of the present invention, more than one DISTINCT key in a SELECT clause for a query is allowed. This enhancement is accomplished by performing multiple sorts on multiple DISTINCT columns. As a result, when multiple DISTINCT column values need to be processed, only one query is required, and there is no need to rewrite the query to perform multiple queries for each DISTINCT key column.

DETAILED DESCRIPTION

The present invention relates to executing a query having multiple DISTINCT key columns. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
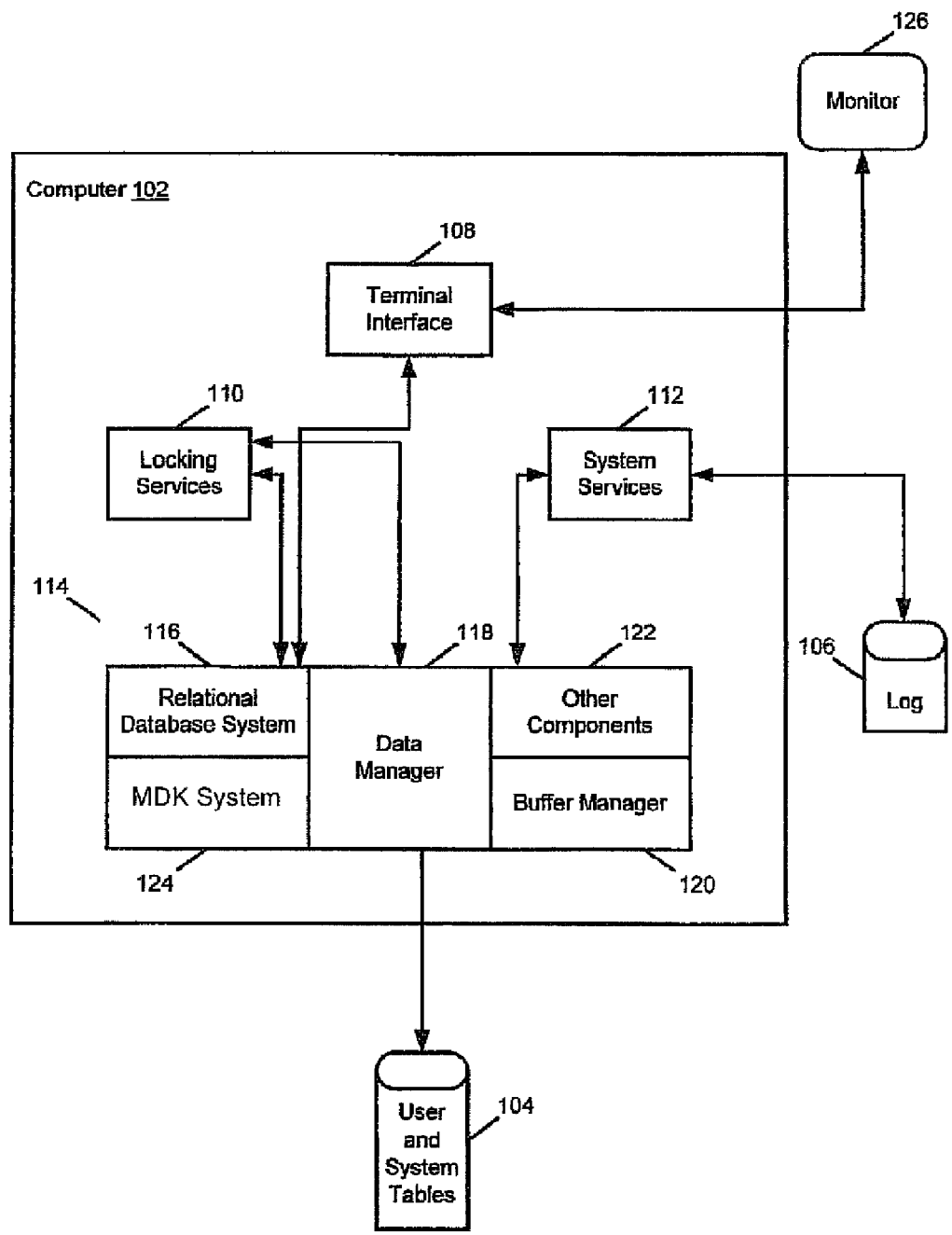
FIG. 1 is a block diagram illustrating an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC®, or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

In the preferred embodiment of the present invention, the RDBMS software comprises the DB2® product offered by IBM for the OS/390® operating system. Those skilled in the art will recognize, however, that the present invention has application program to any RDBMS software, whether or not the RDBMS software uses SQL.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Multiple Distinct Key System 124, and other components 122 such as an SQL compiler/interpreter. These submodules support the functions of the SQL language, i.e. definition, access control, interpretation, compilation, database retrieval, and update of user and system data. The Multiple Distinct Key system 124 works in conjunction with the other submodules. The Multiple Distinct Key system 124 includes fetch and sort programs that are used to perform the DISTINCT operations.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g., one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Those skilled in the art will recognize that the exemplary environment illustrated in FIG. 1 is not intended to limit the present invention. Indeed, those skilled in the art will recognize that other alternative hardware environments may be used without departing from the scope of the present invention.

The Multiple Distinct Key (MDK) system 124 of the present invention provides an efficient technique for executing a query having multiple DISTINCT key columns. In particular, the MDK system 124 recognizes when multiple DISTINCT keys exist, and invokes a SORT process to perform multiple sorts on the multiple DISTINCT key columns. According to a preferred embodiment of the present invention, when the SORT process is notified of a query having multiple DISTINCT keys and the SORT process determines that more than one sort will be performed, the SORT process executes a first DISTINCT operation on a first DISTINCT key. As the data is fetched from the relevant table(s), the SORT process creates a temporary master workfile to store the data retrieved for the first DISTINCT operation, and sorts the data on the first DISTINCT key. On all subsequent DISTINCT operations, the input data is fetched from the temporary master workfile, thereby eliminating the need to access repeatedly the database. The method and system of the present invention will be described in more detail with reference to FIG. 2 and FIG. 3.

Figure 2:
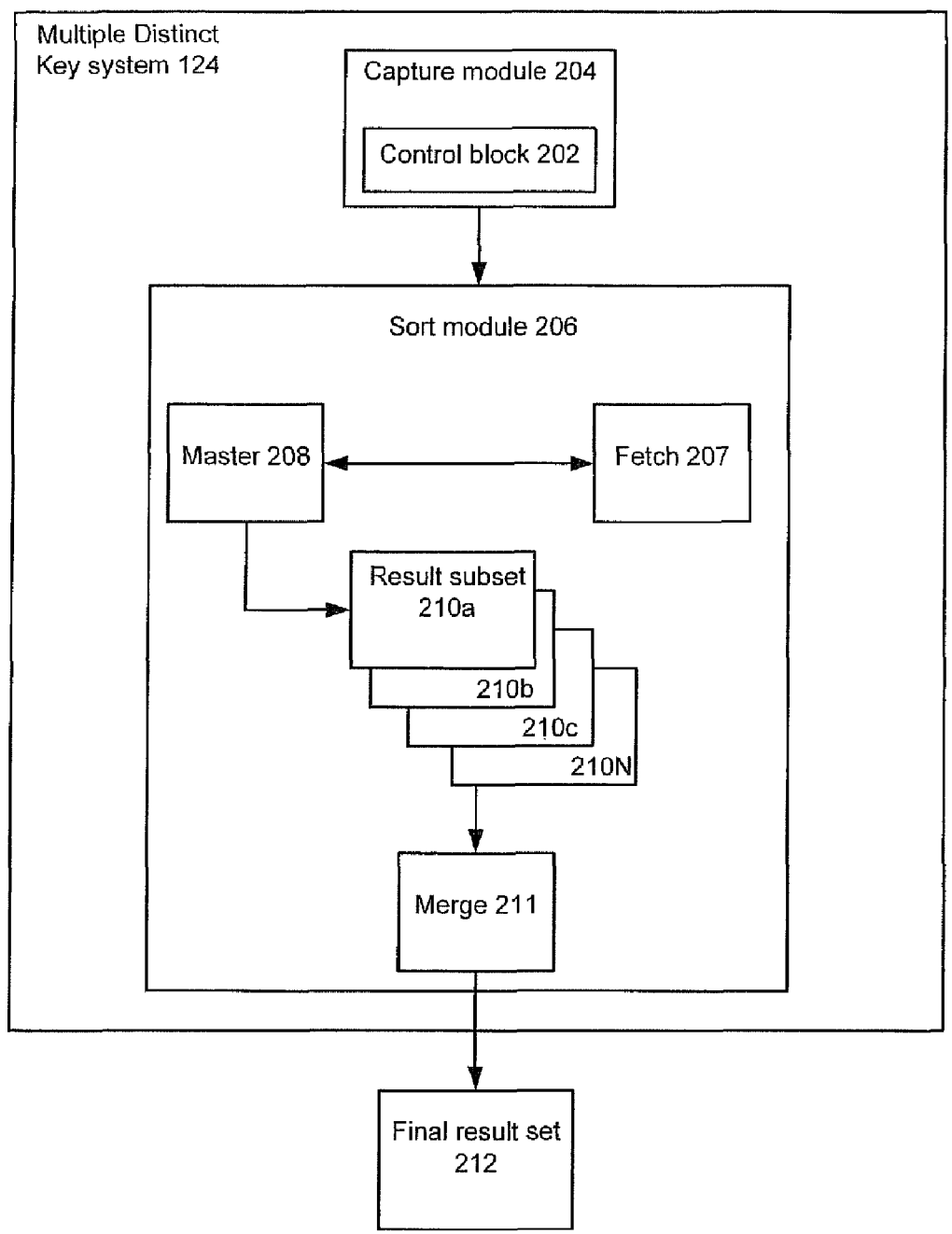
FIG. 2 is a block diagram illustrating the Multiple Distinct Key system in accordance with a preferred embodiment of the present invention
Figure 3:
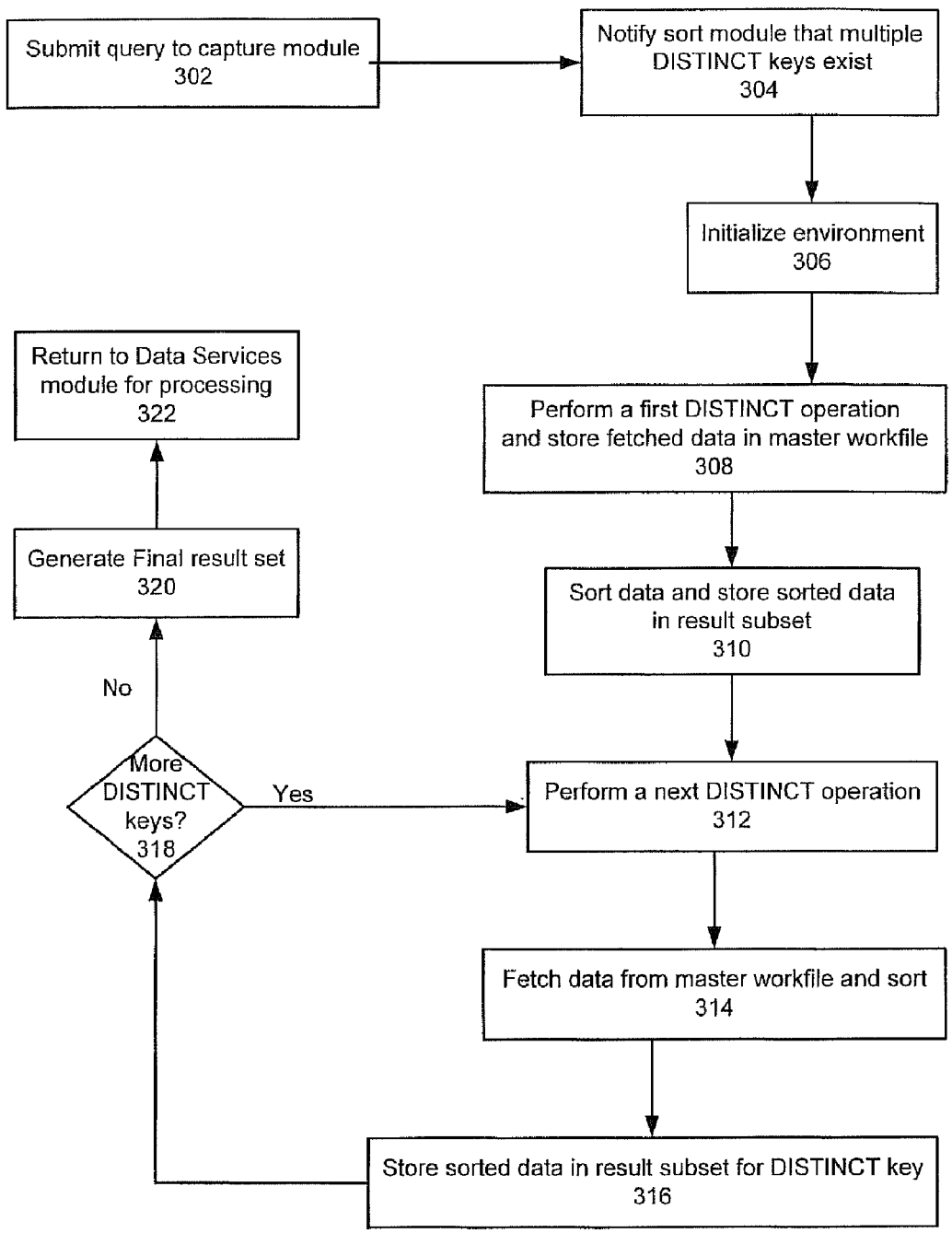
FIG. 3 is a flowchart illustrating a process according to a preferred embodiment of the present invention.

FIG. 2 is a block diagram illustrating the MDK system 124 in accordance to a preferred embodiment of the present invention. FIG. 3 is a flowchart illustrating a process for executing a query having multiple DISTINCT key columns. As is shown in FIG. 2, the MDK system 124 includes a capture module 204 and a sort module 206, which work in conjunction with one another to process a query having multiple DISTINCT keys. The capture module 204 receives the query submitted via step 302. In a preferred embodiment, the query is optimized prior to its submission to the capture module 204 in order to minimize the number of DISTINCT keys. Optimization can be performed by any number of optimization techniques known to those skilled in the art.

If the query has multiple DISTINCT keys, the capture module 204 will notify the sort module that multiple DISTINCT keys exist in step 304. In a preferred embodiment, the capture module 204 notifies the sort module 206 by identifying the DISTINCT keys and, if applicable, a GROUP BY key(s), storing that information in a control block 202, and transmitting the control block 202 to the sort module 206.

In step 306, once the sort module 206 is notified of the query, the sort module 206 initializes the environment for processing the DISTINCT keys. In a preferred embodiment, the sort module 206 determines the total number of sorts that the sort module 206 will perform based on the DISTINCT keys. In general, the number of sorts will be equal to the number of DISTINCT keys. Nevertheless, under certain circumstances, one sort can be performed for more than one DISTINCT key, as is well known to those skilled in the art. Thus, the number of sorts is not necessarily equal to the number of DISTINCT keys. This becomes relevant later in the process when the sort module 206 determines whether to create a temporary workfile. Also at this time, if a GROUP BY key exists, the sort module 206 creates a structure to evaluate each DISTINCT group, e.g., by designating a different keysize for each DISTINCT key field.

The sort module 206 also determines which set functions will be performed for each DISTINCT sort. In a preferred embodiment, the sort module 206 will evaluate most non-DISTINCT set functions in the first DISTINCT sort. Then, for subsequent DISTINCT sorts, the sort module 206 will not need to evaluate non-DISTINCT set functions. The following example illustrates this preferred embodiment. Suppose the following query is submitted:

SELECT COUNT (DISTINCT A1), COUNT (DISTINCT A2),
COUNT (A4), COUNT (A9), SUM (A6), AVG (A7), COUNT (A2)
FROM T1
GROUP BY A5

The sort module 206 determines that two DISTINCT keys exist (A1, A2) and that two sorts will be performed to evaluate two DISTINCT groups (A5+A1; A5+A2). During the first sort routine, the sort module 206 will sort for A5+A1 and evaluate the following set functions: COUNT (DISTINCT A1), COUNT (A4), COUNT (A9), SUM (A6), AVG (A7). Note that the set function COUNT (A2) will not be evaluated because A2 is a DISTINCT key column. The sort module 206 will evaluate COUNT (A2) when it sorts for A5+A2.

Referring again to FIGS. 2 and 3, after the sort module has initialized the environment, the sort module 206 performs a first DISTINCT operation for a first DISTINCT key. While performing the first DISTINCT operation, the sort module 206 invokes a fetch module 207 to retrieve data from the database 104 (FIG. 1), e.g., rows from one or more tables in the database. If the sort module 206 has determined that more than one sort will be performed (in step 306), the sort module 206 stores the data in a temporary master workfile 208 as the data is retrieved, via step 308. The sort module 206 then sorts the retrieved data according to the first DISTINCT key, and stores the sorted data in a result subset 210a corresponding to the first DISTINCT key, via step 310.

In step 312, the sort module 206 performs a next DISTINCT operation for another DISTINCT key. Now, instead of going to the database 104, the fetch module 207 reads the data from the master workfile 208, and the sort module 206 sorts the data according to the corresponding DISTINCT key, in step 314. Next, in step 316, the sort module 206 stores the sorted data in a result subset 210b corresponding to the DISTINCT key. The sort module 206 then determines, in step 318, whether more DISTINCT keys exist. If more exist, then the process described in steps 312-318 are repeated.

After the data has been sorted for each of the DISTINCT keys, a merge module 211 collects the result subsets 210a-210$_N$ and generates a final result set 212, in step 320. Preferably, the merge module 211 generates the final result set 212 by reading out rows of each result subset 210a-210$_N$ and placing the data back into an original field position corresponding to an original table. After each row is read out of each result subset 210a-210$_N$ and merged into its appropriate position, the merge module 211 will write the data to the final result set 212. The final result set 212 is then returned to the Data Services module 114 for normal processing in step 322.

In a preferred embodiment of the present invention, only two process steps, submitting the query (step 302) and notifying the sort module 206 (step 304), are performed at bind time. The remainder of the process (steps 306-322) is executed at runtime during a SORT process. By executing the bulk of the process at runtime, as opposed to bind time, performance is improved while minimizing any impact on other components in the RDBMS.

Moreover, the method and system of the present invention saves processing resources and time by fetching data from the database only once during the first DISTINCT operation. On all subsequent DISTINCT operations, the data is fetched from the master workfile, where the data is already stored in its proper format. Thus, the processing needed to perform all of the DISTINCT operations in accordance with the method and system of the present invention is much less than that needed to perform multiple queries for each DISTINCT key.

Through aspects of the method and system of the present invention, more than one DISTINCT key in a SELECT clause for a query is allowed. This enhancement is accomplished by performing multiple sorts on multiple DISTINCT columns. As a result, when multiple DISTINCT column values need to be processed, only one query is required, and there is no need to rewrite the query to perform multiple queries for each DISTINCT column.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer readable medium containing program instructions for executing a query to access data stored in a database, wherein the query includes a plurality of DISTINCT keys, the program instructions for:
   (a) determining if more than one sort is needed to execute the query;
   (b) performing a first DISTINCT operation on a first DISTINCT key of the plurality of DISTINCT keys, comprising
       (b1) optimizing the query; and
       (b2) analyzing the query comprising
           (b2i) identifying the plurality of DISTINCT keys; and
           (b2ii) writing the plurality of DISTINCY keys to a control block, wherein the control block is used to execute the query;
   (c) storing data from the first DISTINCT operation in a master workfile only if more than one sort is needed to execute the query; and
   (d) utilizing the master workfile to perform subsequent DISTINCT operations on one or more other of the plurality of DISTINCT keys,
   wherein the one or more subsequent DISTINCT operations are performed after completion of the first DISTINCT operation, each operation being controlled by the sort process.

2. The computer readable medium of claim 1, wherein the providing instruction (b) includes:
   (b1) fetching data from at least one table in the database;
   (b2) sorting the fetched data on a column designated by the first DISTINCT key; and
   (b3) storing the sorted data in result subset associated with the first DISTINCT key.

3. The computer readable medium of claim 1, wherein the master workfile is a temporary workfile.

4. The computer readable medium of claim 1, wherein the utilizing instruction (d) includes:
   (d1) identifying a next DISTINCT key;
   (d2) fetching data stored in the master workfile;
   (d3) sorting the fetched data on the next DISTINCT key; and
   (d4) storing the sorted data in a result subset associated with the next DISTINCT key.

5. The computer readable medium of claim 4, wherein the utilizing instruction (d) further includes:
   (d5) repeating steps (d1)-(d4) for each of the plurality of DISTINCT keys in the query.

6. The computer readable medium of claim 5, further comprising the instruction for:
   (e) generating a final result set based on each result subset associated with each DISTINCT key.

7. The computer readable medium of claim 1, wherein the providing instruction (b) includes the instructions for:
   (b1) optimizing the query; and
   (b2) analyzing the query.

8. The computer readable medium of claim 7, wherein the analyzing instruction (b2) includes:
   (b2i) identifying the plurality of DISTINCT keys; and
   (b2ii) writing the plurality of DISTINCT keys to a control block, wherein the control block is used to execute the query.

9. The computer readable medium of claim 7, wherein the optimizing instruction (b1) and the analyzing instruction (b2) are performed during a bind time.

10. The computer readable medium of claim 1, wherein the providing instruction (b), the storing instruction (c) and the utilizing instruction (d) are executed by a SORT process at runtime.

11. A relational database management system for executing a query to access data stored in a database, wherein the query includes a plurality of DISTINCT keys, comprising a processor;
a capture module for identifying each of the plurality of DISTINCT keys in the query; and
a sort module coupled to the capture module for determining if more than one sort is needed to execute the query using the processor, performing a first DISTINCT operation on a first DISTINCT key of the plurality of DISTINCT keys, comprising optimizing the query; and
analyzing the query comprising identifying the plurality of DISTINCT keys; and writing the plurality of DISTINCT keys to a control block, wherein the control block is used to execute the query, storing data fetched from the first DISTINCT operation in a master workfile only if more than one sort process is needed to execute the query, and utilizing the master workfile to perform subsequent DISTINCT operations on the other of the plurality of DISTINCT keys.

12. The system of claim 11, wherein the sort module includes a fetch module for fetching data from at least one table in the database during the first DISTINCT operation.

13. The system of claim 12, wherein the fetch module fetches data in the master workfile for each subsequent DISTINCT operation.

14. The system of claim 13, wherein for each DISTINCT key, the sort module reads the data fetched by the fetch module, sorts the data on the DISTINCT key, and stores the sorted data for the DISTINCT key in an associated result subset.

15. The system of claim 14, wherein the sort module includes a merge module for merging each of the associated result subsets to form a final result set.

16. The system of claim 11, wherein the capture module is invoked during a bind time.

17. The system of claim 11, wherein the sort module is invoked during a runtime.

* * * * *